US008066414B2

(12) United States Patent
Pabst et al.

(10) Patent No.: US 8,066,414 B2

(45) Date of Patent: Nov. 29, 2011

(54) LED LAMP

(75) Inventors: Wolfgang Pabst, Deisenhofen (DE); Steffen Straub, Regensburg (DE)

(73) Assignee: Osram AG, Munich (DE)

( * ) Notice: Subject to any disclaimer, the term of this patent is extended or adjusted under 35 U.S.C. 154(b) by 52 days.

(21) Appl. No.: 12/199,472

(22) Filed: Aug. 27, 2008

(65) Prior Publication Data

US 2009/0059559 A1 Mar. 5, 2009

(30) Foreign Application Priority Data

Aug. 28, 2007 (DE) ......................... 10 2007 040 444

(51) Int. Cl.
*B60Q 1/06* (2006.01)

(52) U.S. Cl. .................. 362/373; 362/650; 362/249.02; 362/649; 362/345

(58) Field of Classification Search .................. 362/294, 362/373, 650, 249.02, 649, 345
See application file for complete search history.

(56) References Cited

U.S. PATENT DOCUMENTS 6,787,999 B2 * 9/2004 Stimac et al. .................... 315/51
6,864,513 B2 * 3/2005 Lin et al. ......................... 257/99
7,144,140 B2 * 12/2006 Sun et al. ...................... 362/373
7,476,002 B2 * 1/2009 Wolf et al. ..................... 362/231
7,524,089 B2 * 4/2009 Park ............................. 362/294
7,607,802 B2 * 10/2009 Kang et al. .................... 362/294
7,637,628 B2 * 12/2009 Budike ......................... 362/247
2002/0176250 A1 * 11/2002 Bohler et al. ................ 362/236
2004/0109318 A1 * 6/2004 Nash ............................ 362/294
2005/0111234 A1 * 5/2005 Martin et al. ................ 362/555
2007/0201232 A1 * 8/2007 Chen ............................ 362/294
2007/0230184 A1 * 10/2007 Shuy ............................ 362/294
2007/0291473 A1 * 12/2007 Traynor ........................ 362/106
2008/0007954 A1 * 1/2008 Li ................................ 362/294
2009/0021944 A1 * 1/2009 Lee et al. ...................... 362/294

FOREIGN PATENT DOCUMENTS

DE 20 2007 002 751 U1 5/2007
EP 10 47 903 B1 6/2007
JP 2004296245 A 10/2004

OTHER PUBLICATIONS

English Translation of Yakoya JP 2004-296245.*
English language abstract for JP 2004296245 A.
German Office Action dated Jul. 13, 2010.

* cited by examiner

*Primary Examiner* — Evan Dzierzynski

(57) ABSTRACT

An LED lamp has a lamp base and a support connected to the lamp base, on which at least one LED is mounted, the support including at least one hollow element, each with at least two air passage openings to permit an air flow through a cavity of at least one hollow element.

20 Claims, 3 Drawing Sheets

LED LAMP

CROSS-REFERENCE TO RELATED APPLICATIONS

This application claims priority to German Patent Application Number 10 2007 040 444.3 filed on Aug. 28, 2007, and which is incorporated herein by reference in its entirety.

BACKGROUND

The invention concerns an LED lamp, in which at least one LED is mounted on a support and the support is connected to a lamp base.

TECHNICAL FIELD

The increased desire for energy saving is accompanied by an increased demand to replace ordinary incandescent lamps, for example, of 40 W to 60 W, by energy-saving LED lamps, and preferably in a so-called retrofit, in which LED lamps can be used in ordinary systems with the most identical possible appearance. In many ordinary standardized volumes, for example, in the standardized volumes of E27 incandescent lamps stipulated by the IEC 60630, passive cooling (cooling elements without forced convection by a fan) to take off power dissipation does not permit operation in a watt range above about 10 W. Previous retrofit lamps operate with passive cooling and are therefore restricted to power dissipations of max 10 W.

SUMMARY

According to an embodiment, an LED lamp may comprise a lamp base and at least one support connected to lamp base, on which at least one LED is mounted, the support having at least one hollow element, each with at least two air passage openings to permit air flow through a cavity of at least one hollow element.

According to a further embodiment, the support may have a well heat-conducting material for heat conduction. According to a further embodiment, the heat-conducting material may be aluminum or copper. According to a further embodiment, the hollow element may have a cylindrical basic shape, whose base surface or cover surface has at least one air passage opening. According to a further embodiment, the hollow element may have a basic shape of a parallelepiped, especially cuboid, in which at least two opposite surfaces each have at least one air passage opening. According to a further embodiment, the support may have several hollow elements. According to a further embodiment, at least one cooling rib or cooling fin may be arranged in at least one cavity. According to a further embodiment, several cooling ribs may be arranged parallel to each other. According to a further embodiment, all cooling ribs may be arranged parallel to each other. According to a further embodiment, the cooling ribs may be arranged angled to each other, especially with angular symmetry. According to a further embodiment, several LEDs may be arranged uniformly or symmetrically on the surface of at least one hollow element. According to a further embodiment, control electronics to control the at least one LED may be integrated in the lamp base. According to a further embodiment, the at least one LED may have at least two LEDs of different color. According to a further embodiment, the LED lamp may further comprise a signal receiver to receive signals to adjust color output. According to a further embodiment, the LED lamp may further comprise a fan for active generation of an air stream through at least one of the hollow elements. According to a further embodiment, the LED lamp may further comprise a control device for temperature-dependent control of the fan power. According to a further embodiment, the LED lamp may further comprise a cover to cover the support. According to a further embodiment, the cover may have a light-scattering property. According to a further embodiment, the cover may have a base shape in the form of a bulb of an ordinary incandescent lamp. According to a further embodiment, the cover may comprise phosphor. According to a further embodiment, the LED lamp may further comprise at least one air passage opening in cover or an air outlet opening to blow out an exhaust stream. According to a further embodiment, the LED lamp may further comprise at least one air passage opening in the lamp base or an air inlet opening to draw in an air stream in the cavity of at least one hollow element.

BRIEF DESCRIPTION OF THE DRAWINGS

The invention is more precisely explained in the following figures by means of practical examples schematically. For better clarity, the same or equivalent elements can then be provided with the same reference numbers.

DETAILED DESCRIPTION

Figure 1:
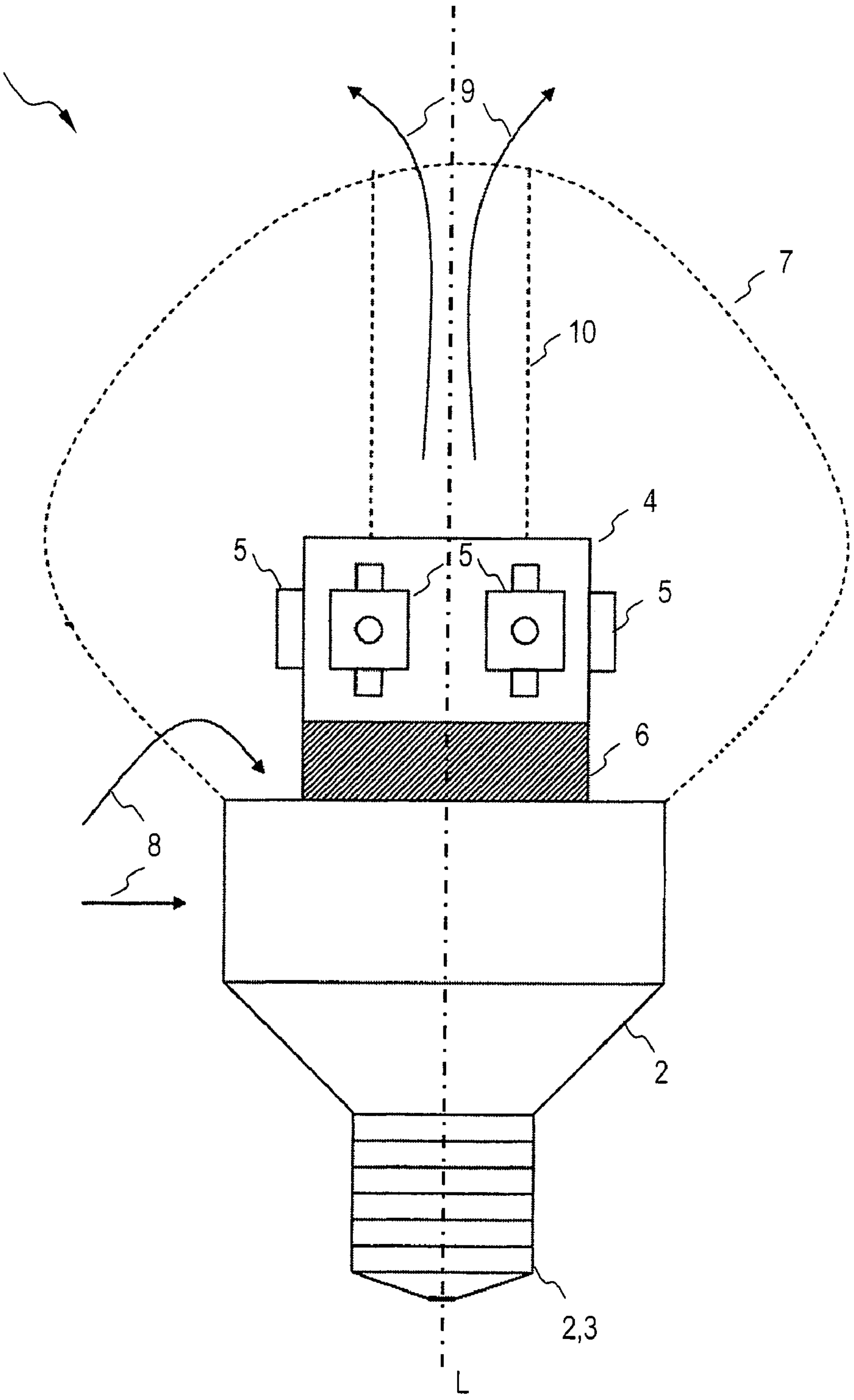
FIG. 1 shows an LED lamp in a side view.

According to an embodiment, the LED lamp may have a lamp base and at least one support connected to the lamp base, at least one LED being mounted on the support. The support also has at least one hollow element with at least two openings to permit air flow through a cavity of at least one hollow element.

By forming the support as a hollow element with at least two openings, an air stream can be produced through the cavity of the cooling element during operation of the LED lamp, which cools the support and therefore the elements mounted on it. Consequently, lamps, especially retrofit LED lamps, can be provided with a higher power than 10 W in permanent operation even with passive cooling.

The lamp base can be of any shape and, for example, can be designed as an Edison base (for example, according to DIN 40400 or IEC 60238, like E27 or E14) or as a bayonet base (for example, B15d or B22d).

A single-color (including white) LED can be used as LED, or several, especially different colored LEDs (including white).

The support can be preferably designed, so that it stands perpendicular relative to the LED lamp, i.e., with its openings one above the other. Because of this, a chimney effect with increased air flow and therefore improved air cooling can be generated.

The support can be preferably well heat-conducting, for example, having aluminum or copper for heat conduction. The support can be designed in one variant as a metal core plate that improves heat distribution in the support.

The LED can also be directly mounted on the hollow element. In particular, a dielectric can be mounted on the hollow element for electrical insulation, for example, by means of lamination, painting, gluing and/or coating. Foils, powders, oxide layers and/or flex boards can be used for this purpose.

The shape of the hollow element is not restricted to a specific shape or basic shape, as long as the shape permits air flow.

An LED lamp, in which the hollow element has a cylindrical basic shape, whose base surface and/or cover surface has at least one air passage opening, may be particularly preferred.

As an alternative, an LED lamp can be preferred, in which the hollow element has the base shape of a parallelepiped, especially a cuboid, in which at least two opposite surfaces each have at least one air passage opening.

However, other basic shapes are also possible, for example, with constrictions and/or widenings of the flow cross-section, direction changes and so forth. Openings can be present as an alternative or in addition at another site in the support, for example, in a side wall. The support need only have or form one hollow element. However, it can also be preferred if the support has or forms several hollow elements, for example, several cuboid and/or cylindrical hollow elements, especially when they are connected to each other by cooling ribs.

For a further increase in cooling effect, it is advantageous, if at least one cooling rib, especially a cooling fin, be arranged in at least one cavity.

It can then be particularly advantageous, if several cool ribs are arranged parallel to each other. This also includes a case, in which several groups are present, each with parallel-arranged cooling ribs, the orientation of the cooling ribs being different from group to group.

In some embodiments, it can be preferred, if all cooling ribs are arranged parallel to each other.

However, it can also be advantageous, if cooling ribs are arranged angled to each other, especially angularly symmetric, for example, stellate in top view.

For good heat distribution and uniform light radiation, several LEDs, especially all LEDs, may be preferably arranged uniformly (especially symmetrically) on the surface (especially outward-directed surface) of at least one hollow element. This achieves a situation, in which the LED lamp comes close in its emission characteristic to that of an incandescent lamp.

An LED lamp may be preferred, in which control electronics to operate the at least one LED is integrated in the lamp base. As an alternative, control components can also or exclusively be mounted on the support.

For flexible color adjustment, the LED has at least two LEDs of different color, especially for additive color mixing to white. For additive color mixing to white, LED clusters from the color combinations RGB, RGGB, RRGB, etc. are particularly advantageous. For variable adjustment of color, the control electronics can vary a pulse width control of the LEDs.

For convenient adjustment of the color of the emitted light, the LED lamp preferably may have a signal receiver to receive corresponding control signals. The control signals can use radio infrared as medium, for example via a WLAN network (signal receiver is a WLAN receiver), via an SMS (signal receiver is a telephone-radio receiver, for example, a GSM receiver) and so forth.

To further increase the cooling power, the LED lamp preferably may have a fan for active generation of an air stream through at least one hollow element. The fan preferably may sit on an air passage opening of a hollow element.

An LED lamp, having a control device for temperature-dependent control of fan power, may be also preferred.

The LED lamp preferably also may have a cover to cover the support.

The cover preferably may have a light-scattering property, has a base shape in the form/outline of a bulb of an ordinary incandescent lamp and/or has a phosphor, especially for wavelength conversion, for example, based on phosphorus.

For even further reinforced cooling effect, the cover preferably may have at least one air passage opening in the cover, especially an air outlet opening to blow out an air stream, especially in the upper area of the cover, but also, or in addition, an air inlet opening to draw in an air stream, especially in the lower area of the cover.

The passage opening can also be provided on the lower end of the cover, so that blowing against the viewer is effectively prevented. The LED can also be flowed around from the outside.

For increased cooling effect, an LED lamp having at least one air passage opening in the lamp base may also be preferred, especially as an air inlet opening to draw in an air stream into the cavity of the at least one hollow element.

FIG. 1 shows an LED lamp with a socket or a lamp base 2, which includes a screw thread 3, for example, according to E27 or E14. A support 4, on which several LEDs 5 are mounted and specifically in the peripheral direction, distributed as equally as possible on the outside, is electrically and mechanically connected to lamp base 2. The support 4 is designed as a vertically standing hollow element, as further described in detail below. The support 4 has an air passage opening on the top and bottom (without figure) to permit an essentially vertical air stream through a cavity or internal space in it. The support 4 sits on a fan 6, which covers the lower air passage opening. Air flow through support 4 is intensified by fan 6.

The support 4 and fan 6 are enclosed by a transparent cover 7, which fits in a standardized outline for incandescent lamps, so that the user observes a trusted lamp shape, which increases product acceptance. In order for good cooling to be achieved on support 4, air passage openings outward are provided in the LED lamp 1. In particular, air intake openings (without figure) are provided laterally in base 2 and in the lower part of cover 7, through which an incoming air stream 8 is produced from the outside into the LED lamp 1 or the intake side of fan 6. The fan 6 blows the drawn-in cooling air 8 through the cavity of support 4 upward, in which the discharge stream 9 is released outward through a discharge channel 10 in cover 7.

The cover can be designed transparent or scattering, milky white and/or with a phosphor. By the essentially uniform arrangement of LEDs 5, a light characteristic close to an ordinary light bulb is produced. Primary optics, for example, Argus lenses, can be used here.

Figure 2:
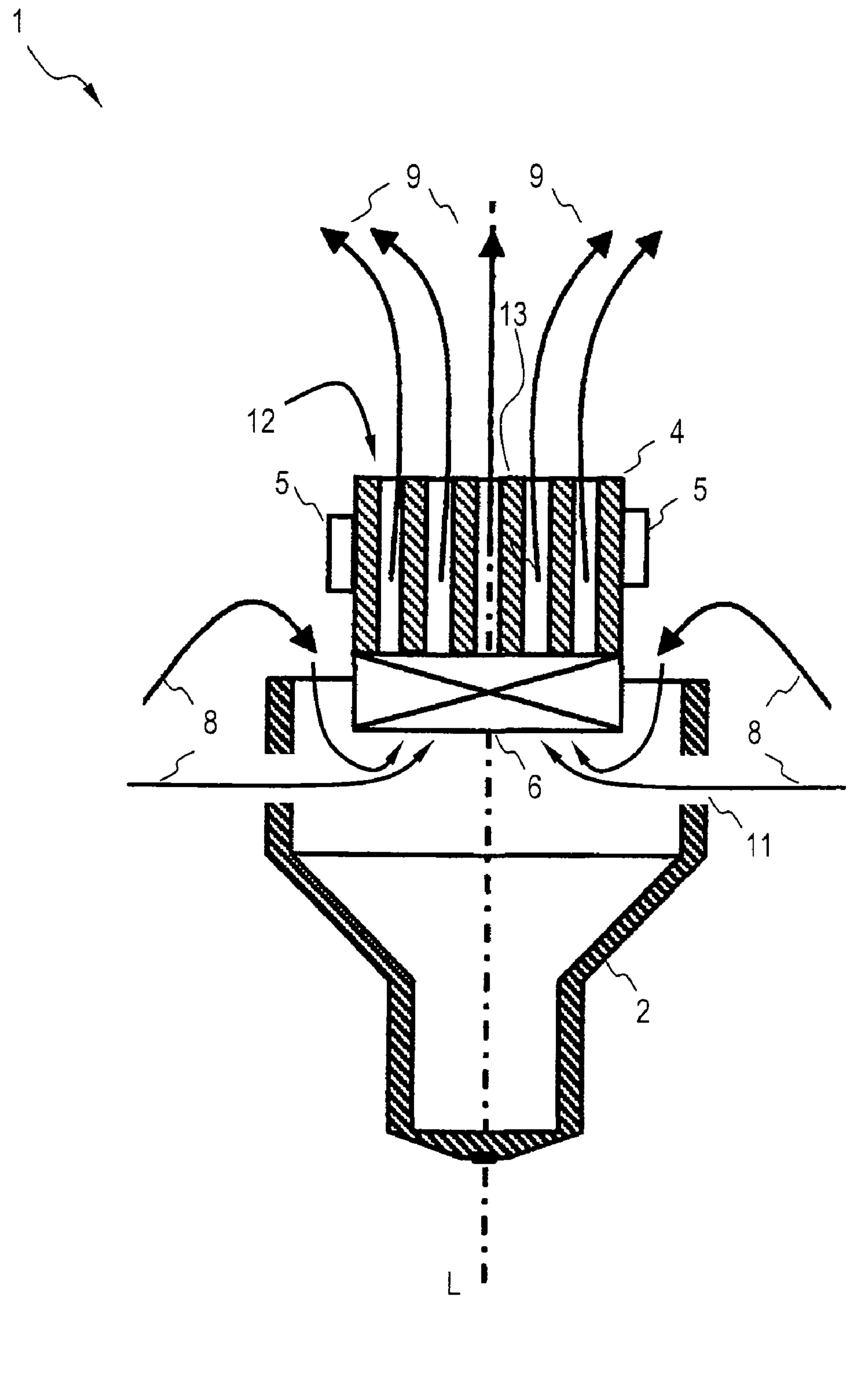
FIG. 2 shows the LED lamp from FIG. 1 in a side view as a simplified sectional depiction.

FIG. 2 shows the LED lamp from FIG. 1 as a simplified sectional view, for example, leaving out the cover.

The cooling air 8 is guided through openings in the cover (without figure) and openings 11 in the base 2 to fan 6 and blown out through a cavity 12 of the support 4 upward as discharge stream 9. Cooling fins 13 for reinforced cooling of the support 4 are arranged in cavity 12. By cooling the support 4, the power demand of the LED lamp can be increased. Heat sources mounted on the support 4 (LEDs 5 and optionally additional electrical or electronic components (without figure)) are also cooled, so that the lifetime is increased.

The passage opening could also be provided on the lower end of the cover, so that blowing against the viewer is effectively prevented. The LED can also be flowed around from the outside.

Figure 3:
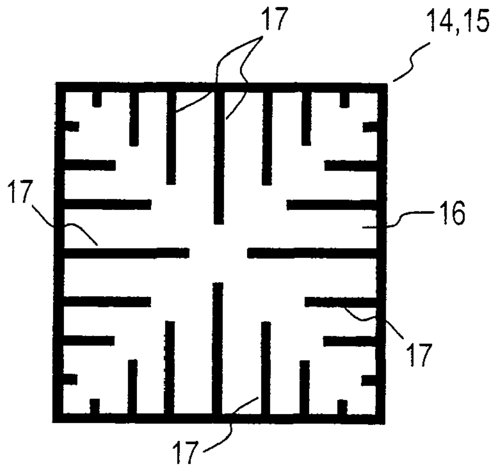
FIG. 3 shows the support in a top view with cooling ribs according to a first embodiment.

FIG. 3 shows in a top view a square support 14 (a cuboid support in three dimensions), which forms a hollow element 15 with a cavity 16 for passage of a cooling air stream. The support 14 and the cavity 15 enclose cooling fins 17, which extend from the wall of support 14 into cavity 16. The cooling fins 17 are formed from a well heat-conducting metal, copper or aluminum. The cooling fins 17 form four groups of straight and parallel cooling ribs with graded length, each of which start from a different side wall of support 14. The center point of support 14 can correspond to a location on the longitudinal axis and the support 14 can extend accordingly along the longitudinal axis of the LED lamp, here perpendicular to the plane of the drawing. The LEDs (not shown) are mounted on the outside of the support 14. The plate 17 can be connected to a metal core of the support 14 by heat-conducting contacts.

Figure 4:
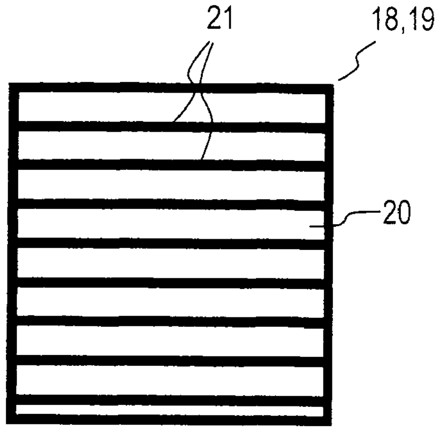
FIG. 4 shows a support in a top view with cooling ribs according to a second embodiment.

FIG. 4 shows another variant of a support 18 in a view similar to FIG. 3. Here again, the square-shaped support 18 has in a top view a cavity 20 with cooling fins 21 as individual hollow element 19. The cooling fins 21, in contrast to FIG. 3, however, are now all arranged parallel and extend from one side wall to the opposite side wall.

Figure 5:
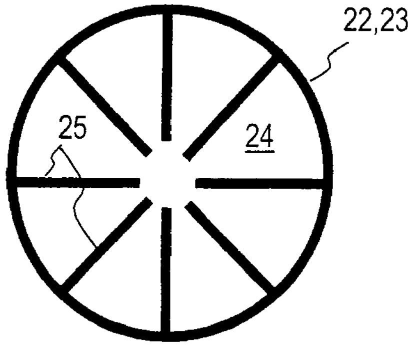
FIG. 5 shows a support in a top view with cooling ribs according to a third embodiment.

FIG. 5 shows another variant of a support 22 in a view similar to FIG. 3. The support 22, however, is now designed in a top view circular as a single hollow element 23. The support 22 and hollow element 23 have in cavity 24 straight cooling fins 25, which extend from the wall to the center in stellate fashion. Viewed three-dimensionally, the support 22 has a cylindrical basic shape or outside contour. This support 22, relative to the supports from FIG. 3 and FIG. 4, has the advantage that LEDs can be arranged on the outside in the peripheral direction more uniformly distributed, for example, with radial symmetry.

Figure 6:
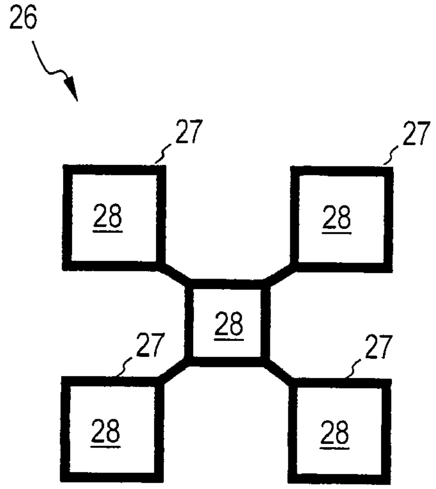
FIG. 6 shows a support with cooling ribs in a top view according to a fourth variant.

FIG. 6 shows in a top view another variant of a support 26 in a view similar to FIG. 3. In this variant, the support 26 has five hollow elements 27 with cavities 28 without cooling ribs. As an alternative, the cavities 28 can also have cooling ribs. The hollow elements 27 are connected to each other via connection elements. The LEDs can be mounted on the hollow elements 27, but also the connection elements.

The invention is not restricted to the described features. The LED lamp need not have a fan. An improved cooling effect is also already achieved, if no or a few air passage openings are present in the cover. An LED lamp without a cover is also included. In addition, the cooling elements need not be designed as straight fins, but, as required, can be arbitrarily shaped, for example, freely curved.

LIST OF REFERENCE NUMBERS

1 LED lamp
2 Lamp base
3 Screw thread
4 Support
5 LED
6 Fan
7 Cover
8 Cooling air stream
9 Exhaust stream
10 Exhaust channel
11 Opening
12 Cavity
13 Cooling fin
14 Support
15 Hollow element
16 Cavity
17 Cooling fin
18 Support
19 Hollow element
20 Cavity
21 Cooling fin
22 Support
23 Hollow element
24 Cavity
25 Cooling fin
26 Support
27 Hollow element
28 Cavity
L Longitudinal axis

What is claimed is:

1. A retrofit LED lamp,
comprising a lamp base and at least one support connected to the lamp base, on which at least one LED is mounted, the support comprising several hollow elements, each with at least two air passage openings to permit air flow through a respective cavity of the hollow elements,
wherein the hollow elements have a cylindrical basic shape or a basic shape of a parallelepiped standing perpendicular relative to the LED lamp,
wherein the hollow elements are connected by cooling ribs, and
wherein the LED lamp further comprises a cover enclosing the support.

2. The retrofit LED lamp according to claim 1, wherein at least one cooling rib or cooling fin is arranged within the cavity in a vertical manner.

3. The retrofit LED lamp according to claim 2, wherein several cooling ribs are arranged parallel to each other.

4. The retrofit LED lamp according to claim 3, wherein all cooling ribs are arranged parallel to each other.

5. The retrofit LED lamp according to claim 2, wherein the cooling ribs are arranged angled to each other or angled to each other with angular symmetry.

6. The retrofit LED lamp according to claim 1, wherein several LEDs are arranged uniformly or symmetrically on the surface of at least one hollow element.

7. The retrofit LED lamp according to claim 1, wherein the at least one LED has at least two LEDs of different color and wherein the retrofit LED lamp further comprises a signal receiver for receiving control signals for adjustment of a color of an emitted light.

8. The retrofit LED lamp according to claim 1, further comprising a fan for active generation of an air stream through at least one of the hollow elements.

9. The retrofit LED lamp according to claim 1, wherein the cover has a light-scattering property.

10. The retrofit LED lamp according to claim 1, wherein the cover has a base shape in the form of a bulb of an ordinary incandescent lamp.

11. The retrofit LED lamp according to claim 1, wherein the cover comprises phosphor.

12. The retrofit LED lamp according to claim 1, comprising at least one air passage opening of the cover.

13. The retrofit LED lamp according to claim 1, comprising at least one air passage opening in the lamp base or an air inlet opening to draw in an air stream in the cavity of at least one hollow element.

14. The retrofit LED lamp according to claim 1, wherein the support is designed as a metal core plate.

15. The retrofit LED lamp according to claim 1, wherein the LED lamp comprises control components for operating the at least one LED wherein at least one control component is mounted on the support.

16. The retrofit LED lamp according to claim 1, wherein the cover comprises an elongated discharge channel leading from a discharge opening of the support to an outside of the LED lamp.

17. The retrofit LED lamp according to claim 1, wherein the hollow elements have a basic shape of a parallelepiped and the cooling ribs connect outer edges of the hollow elements.

18. The retrofit LED lamp according to claim 1, wherein the support comprises a discharge opening that is positioned within the cover.

19. The retrofit LED lamp according to claim 18, wherein the cover is shaped such that it provides an elongated discharge channel, and wherein the elongated discharge channel connects the discharge opening of the support to an outside of the LED lamp.

20. A retrofit LED lamp, comprising:

a lamp base and at least one support connected to lamp base, on which at least one LED is mounted, the support comprising several cuboid or cylindrical hollow elements, each with at least two air passage openings to permit air flow through a respective cavity of the hollow elements, wherein the hollow elements have a cylindrical basic shape or a basic shape of a parallelepiped standing perpendicular relative to the LED lamp, wherein the hollow elements are connected by cooling ribs, and wherein the LED lamp further comprises a cover enclosing the support.

* * * * *